United States Patent [19]

Shindo et al.

[11] Patent Number: 4,718,310
[45] Date of Patent: Jan. 12, 1988

[54] SHIFT CONTROL SYSTEM OF AUTOMATIC TRANSMISSION FOR VEHICLE

[75] Inventors: Yoshio Shindo; Kunihiro Iwatsuki, both of Toyota, Japan

[73] Assignee: Toyota Jidosha Kabushiki Kaisha, Toyota, Japan

[21] Appl. No.: 800,785

[22] Filed: Nov. 22, 1985

[30] Foreign Application Priority Data

Nov. 22, 1984 [JP] Japan .................. 59-247428

[51] Int. Cl.[4] .................................. B60K 41/04
[52] U.S. Cl. .......................... 74/867; 74/752 A; 74/869
[58] Field of Search .................. 74/865, 866, 867, 868, 74/869, 745, 740; 364/424.1

[56] References Cited

U.S. PATENT DOCUMENTS

| 2,923,175 | 2/1960 | Perkins | 74/740 |
|---|---|---|---|
| 4,314,340 | 2/1982 | Miki et al. | 364/424.1 |
| 4,324,153 | 4/1982 | Sugimoto et al. | 74/866 |
| 4,335,428 | 6/1982 | Miki et al. | 364/424.1 |
| 4,367,528 | 1/1983 | Kawamoto et al. | 74/866 |
| 4,432,255 | 2/1984 | Borman et al. | 74/869 |
| 4,441,385 | 4/1984 | Taga et al. | 74/865 |
| 4,513,850 | 4/1985 | Plate | 192/3.58 |
| 4,527,448 | 7/1985 | Person et al. | 74/869 |

FOREIGN PATENT DOCUMENTS

| 0030558 | 2/1983 | Japan | 364/424.1 |
|---|---|---|---|
| 0149449 | 9/1983 | Japan | 74/359 |

Primary Examiner—Allan D. Herrmann
Attorney, Agent, or Firm—Oblon, Fisher, Spivak, McClelland & Maier

[57] ABSTRACT

A shift control system of an automatic transmission for a vehicle, which includes at least a first transmission and a second transmission, both of which can shift speeds automatically, wherein the first transmission and the second transmission are shifted simultaneously or alternately to achieve multi-speed shifts, an acting force of a frictionally engaging device for switching the second transmission can be properly changed at least in accordance with the types of shifts at the time of switching of the frictionally engaging device, so that, even when any type of shift is performed, the stable shift characteristics having a low shift shock is constantly obtained and no excessive load is applied to the frictionally engaging device.

5 Claims, 7 Drawing Figures

FIG. 4

| | C1 | C2 | CO | BO | B1 | B2 | B3 | SECOND TRANS-MISSION | FIRST TRANS-MISSION |
|---|---|---|---|---|---|---|---|---|---|
| P.N | | | | | | | | | |
| R | | ○ | ○ | | | | ○ | LOW | R W |
| 1 | ○ | | ○ | | | | × | LOW | FIRST SPEED |
| 2 | ○ | | | ○ | × | | × | HIGH | FIRST SPEED |
| 3 | ○ | | ○ | | × | ○ | | LOW | SECOND SPEED |
| 4 | ○ | | | ○ | | ○ | | HIGH | SECOND SPEED |
| 5 | ○ | ○ | ○ | | | ○ | | LOW | THIRD SPEED |
| 6 | ○ | ○ | | ○ | | ○ | | HIGH | THIRD SPEED |

{ B } covers C1–B3; { A } covers SECOND TRANSMISSION and FIRST TRANSMISSION.

SHIFT CONTROL SYSTEM OF AUTOMATIC TRANSMISSION FOR VEHICLE

BACKGROUND OF THE INVENTION

1. Field of the Invention

This invention relates to a shift control system of an automatic transmission for a vehicle, and more particularly to improvements in a shift control system of an automatic transmission for a vehicle, wherein the shift control system includes at least a first and a second transmissions capable of automatically switching speeds, and the first and the second transmissions are shifted to thereby achieve multi-speed shifts.

2. Description of the Prior Art

Along with a rapid spread in use of the automatic transmissions for motor vehicles in recent years, there have been commonly adopted such transmissions wherein a so-called over-drive device, in which a transmission gear ratio is less than 1, is connected as the second transmission, in series to the first transmission capable of automatically switching the shift speeds in association with a vehicle speed, a throttle opening, etc.

Futhermore, there is also known such a transmission wherein, based on a function of the second transmission capable of switching between lower speed and higher speed as the above-described over-drive device, shift controls shown A portion in FIG. 4 for example are performed, so that multi-speed shifts of forward six speeds can achieved. This transmission is of such an arrangement that a shift of the second transmission is actively cooperated with a shift of the first transmission, whereby the first transmission and the second transmission are shifted simultaneously or alternately, so that multi-speed shifts can be achieved. The above-described arrangement makes it possible that the existing automatic transmission is utilized as the basis, and changes in design are minimized for the manufacturing advantage, so that multi-speed shifts can be achieved. As the result, such many advantages can be offered that the fuel consumption rate is improved, the power performance is bettered, the burden of frictional materials is relieved due to making the speed shifts into multi-speed shifts, and the like.

However, in the above-described automatic transmission wherein the first transmission and the second transmission are shifted simultaneously or alternately to achieve the multi-speed shifts, there has been such a disadvantage that it is difficult to obtain satisfactory shift characteristics of all of the shifts accompanied by the high gear shift of the second transmission, by a mere change of an acting force of a frictionally engaging device for the high gear shift of the second transmission in accordance with the throttle opening as in the common practice of the up shift, for example.

Namely, in the case of the shift from the first speed to the second speed, the first transmission remains as it is and only the high gear shift of the second transmission realizes the up shift of the automatic transmission as a whole, as shown in FIG. 4 for example. Furthermore, in the case of the shift from the third speed to the second speed for example, the first transmission is low gear shifted and the second transmission is high gear shifted, whereby the down shift of the automatic transmission as a whole is realized. In this case, if the acting force of the frictionally engaging device to the high gear shift of the second transmission is set at an acting force capable of obtaining the satisfactory shift characteristics in the former case for example, then, in the latter case of the shift, the acting force of the engaging device becomes excessive, whereby the shift characteristics are deteriorated. On the contrary, if the acting force of the engaging device is set at an acting force capable of obtaining satisfactory characteristics in the latter case of the shift, then, in the former case of the shift, the start of the high gear shift is delayed or the time point of completion of the high gear shift is so delayed that the high gear shift of the second transmission is completed after the low gear shift of the first transmission, thus presenting such a disadvantage that the driving feeling of the satisfactory down shift cannot be obtained.

SUMMARY OF THE INVENTION

The present invention has been developed to obviate the above-described disadvantages of the prior art and has as its object the provision of a shift control system of an automatic transmission for a vehicle, capable of constantly obtaining the satisfactory shift characteristics at the time of every shifts accompanied by the high gear shift of a second transmission.

To this end, the present invention contemplates that, in a shift control system of an automatic transmission for a vehicle, wherein there are provided at least a first transmission and a second transmission, both of which can shift the speeds automatically, and the first transmission and the second transmission are shifted to achieve multi-speed shifts, an acting force of a frictionally engaging device for switching the second transmission at the time of switching of the frictionally engaging device is changed at least in accordance with the types of shifts.

A preferred specific form in the above-described construction is of such an arrangement that the acting force at the time of switching of the frictionally engaging device is changed in accordance with at least one of an engine load and a vehicle speed in addition to the type of shift, so that the shift characteristics can be maintained further satisfactorily.

Another preferred specific form is of such an arrangement that the changing means is a duty valve for regulating the hydraulic pressure to the frictionally engaging device which relates to the shift, by duty ratio control.

A further preferred specific form is of such an arrangement that the changing means is a solenoid valve for regulating the hydraulic pressure to the frictionally engaging device which relates to the shift, by load current control.

A still further preferred specific form is of such an arrangement that the duty valve and the solenoid valve have additionally their function as shift valves.

According to the present invention, the acting force of the frictionally engaging device for switching the second transmission can be changed at least in accordance with the type of shift, whereby the second transmission can be shifted by the acting forces optimum to the respective shifts, so that the shifts can be started or completed at the optimum timings at the time of the respective shifts. As a result, the shift shock is small and a driver is given a satisfactory shift feeling.

BRIEF DESCRIPTION OF THE DRAWINGS

The exact nature of this invention, as well as other objects and advantages thereof, will be readily apparent from consideration of the following specification relating to the accompanying derawings, in which like reference characters designate the same or similar parts throughout the figures thereof and wherein:

FIG. 4 is a chart showing the states of engagement and combination of the frictionally engaging device of the automatic transmission; ad

DETAILED DESCRIPTION OF THE INVENTION

Detailed description will hereunder be given of one embodiment of the present invention with reference to the drawings.

Figure 3:
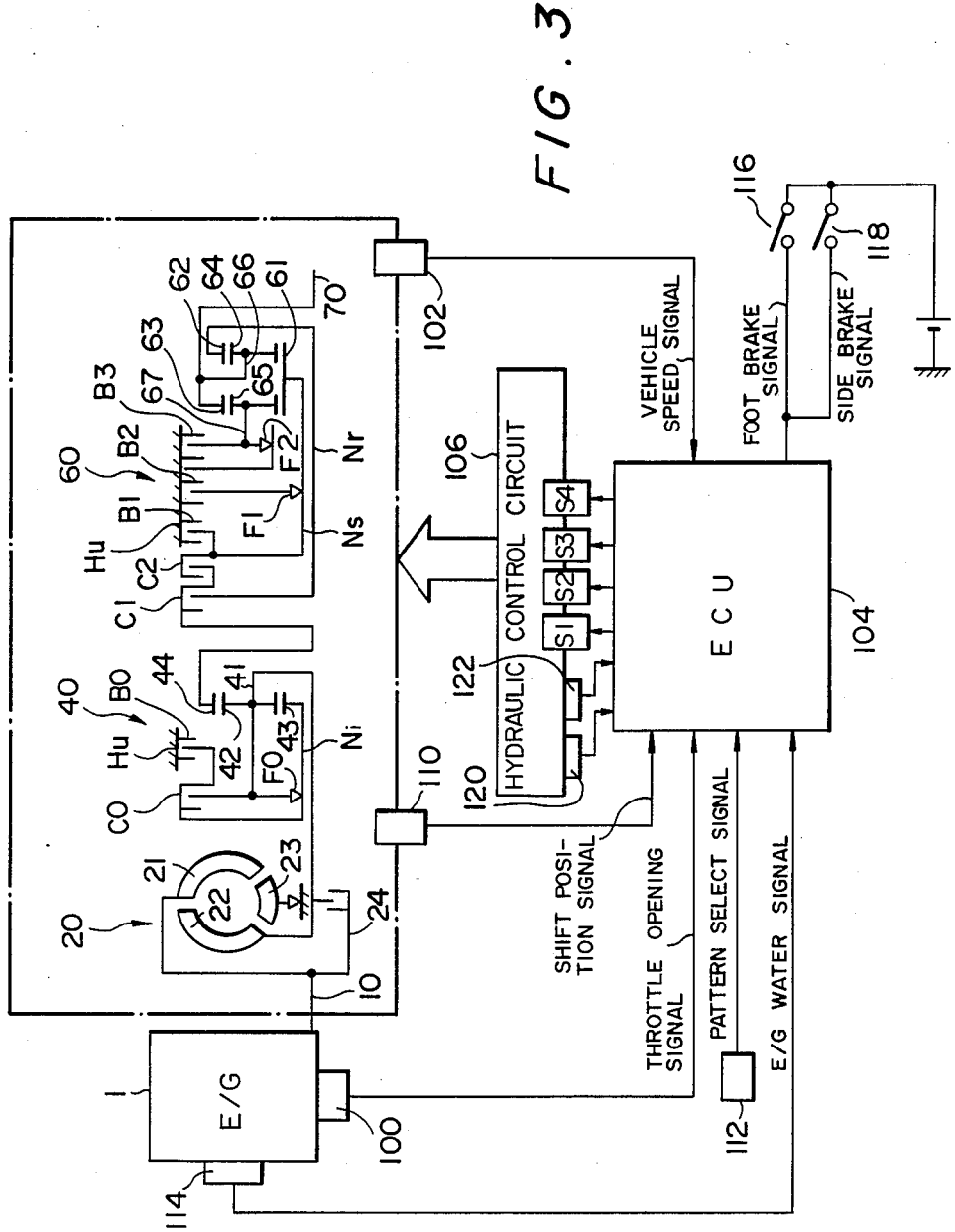
FIG. 3 a general schematic diagram of the automatic transmission, to which is adopted the above embodiment.

FIG. 3 shows the general arrangement of the automatic transmission for a motor vehicle, to which is applied the present invention.

This automatic transmission includes a torque converter 20, a second transmission 40 and a first transmission 60 having three forward speeds and one rearward speed.

The torque converter 20 includes a pump 21, a turbine 22, a stator 23 and a lock-up clutch 24. The pump 21 is connected to a crankshaft 10 of an engine 1, and the turbine 22 is connected to a carrier 41 of a planetary gear train in the second transmission 40.

In the second transmission 40, a planetary pinion 42 rotatably supported by this carrier 41 is in mesh with a sun gear 43 and a ring gear 44. Furthermore, a clutch C0 and a one-way clutch F0 are interposed between the sun gear 43 and the carrier 41. And a brake B0 is interposed between the sun gear 43 and a housing Hu.

In the first transmission 60, there are provided two rows including one on the front side and the other on the rear side as the planetary gear train. This planetary gear train includes a sun gear 61 being commonly used, ring gears 62 and 63, planetary pinions 64 and 65 and carriers 66 and 67.

The ring gear 44 of the second transmission 40 is connected to the ring gear 62 through a clutch Cl. Furthermore, a clutch C2 is interposed between the ring gear 44 and the sun gear 61. Further, the carrier 66 is connected to the ring gear 63, and these carrier 66 and the ring gear 63 are connected to an output shaft 70.

On the other hand, a brake B3 and a one-way clutch F2 are interposed between the carrier 67 and the housing Hu. Further, a brake B2 is provided between the sun gear 61 and the housing Hu through a one-way clutch F1. Furthermore, a brake B1 is interposed between the sun gear 61 and the housing Hu.

This automatic transmission has the above-described transmission section, and solenoid valves S1-S4 in a hydraulic control circuit 106 are driven and controlled in accordance with a shift pattern preset by a control processing unit (CPU) 104 to which are inputted signals from a throttle sensor 100 for detecting a throttle opening representing a load condition of the engine 1, a vehicle speed sensor 102 for detecting a vehicle speed and the like. As the result, combinations of engagements between the clutches, brakes and the like as shown B portion in FIG. 4 are performed for shift control.

Additionally, in FIG. 4, indicated by marks "o" are engagements and marks "x" engagements only when an engine brake is used.

The solenoid valves S1 and S2 perform controls of shift of the first transmission 60, the solenoid valve S3 performs controls on the higher speed side and the lower speed side of the second transmission 40 and the solenoid S4 performs control of the lockup clutch 24 of the torque converter 20, respectively.

Additionally, in FIG. 3, designated at 110 is a shift position sensor for detecting positions of N (Neutral), D (Drive) and R (Reverse), which are operated by the driver, 112 a pattern select switch for detecting position of E (Economical running), P (Power running) and the like, 114 a water temperature sensor for detecting a cooling water temperature of the engine, 116 a brake switch for detecting operations of a foot brake and 118 another brake switch for detecting operations of a side brake, respectively.

Here, in this embodiment, in addition to the above-described input signals, the CPU 104 is inputted thereto with a signal from a pressure switch 120 for detecting a hydraulic pressure in an oil line directed to the brake B2 in order to confirm the start of change in rpm of the rotary members in the first transmission 60 due to a shift command.

Furthermore, in order to feedback-control the hydraulic pressure to the brake B0, a signal from an oil pressure sensor 122 provided in an oil line to the brake B0 is inputted additionally.

Figure 1A:
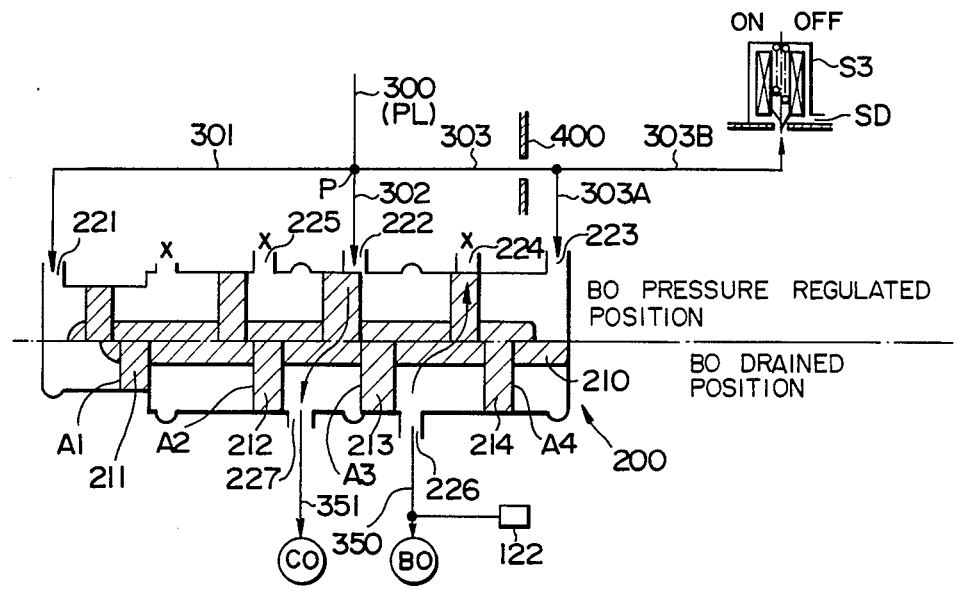
FIGS. 1(A) and 1(B) are circuit diagrams showing the essential portions of the hydraulic control circuits, to which is adopted an embodiment of the shift control system of an automatic transmission for a vehicle according to the present invention.

FIG. 1(A) shows the essential portions of the hydraulic pressure control circuit 106.

Referring to the drawing, designated at 200 is a duty valve additionally functioning a shift valve, controlled by the solenoid valve S3, for switching from the higher speeds to the lower speeds and vice versa of the second transmission 60.

This duty valve 200 has a spool 210 including four lands 211 to 214. The lands 211 to 214 are set at face areas A1 to A4, respectively, and only the face area A1 is smaller in value than other face areas A2 to A4.

On the other hand, a line pressure PL is acting on an oil line 300. This oil line 300 is branched at a branch point P into three oil lines including oil lines 301 to 303. The oil line 301 is inputted to a port 221 of the duty valve 200, and the oil line 302 is inputted to a port 222 of the duty valve 200, respectively. The oil line 303 is inputted to a port 223 of the duty valve 200 through an orifice 400. Furthermore, an oil line 303B branched from an oil line 303A between this orifice 400 and the port 223 is connected to a solenoid valve S3.

Description will hereunder be given of the function of the duty valve 200.

Firstly, description will be given of the function of regulating the hydraulic pressure to the brake B0 with reference to the drawings shown at the top stages of FIGS. 1(A) and 1(B). When the solenoid valve S3 is energized, the hydraulic pressures of the oil lines 303A and 303B begin to drain through a drain port SD of the solenoid valve S3, and the hydraulic pressure of the port 223 is lowered because the oil line 303 is throttled by the orifice 400. On the other hand, the hydraulic pressure of the port 221 is maintained at the line pressure PL, whereby the hydraulic pressure of the port 221 acting on the face A1 of the land 211 becomes larger than the hydraulic pressure of the port 223 acting on the face A4 of the land 214, whereby the spool 210 moves to the right to be brought into the state shown at the top stage of FIG. 1(B), so that the port 222 is closed and a drain port 224 is opened, thereby lowering the hydraulic pressure of an oil line 350 to the brake B0 to weaken the acting force of the brake B0.

On the contrary, if the solenoid valve S3 is deenergized from this state, then the line pressure PL comes to act on the both ports 221 and 223. However, since the face area A1 of the land 211 is set at a value smaller than the face A4 of the land 214, the spool 210 moves to the left in the drawing to be brought into the state shown at the top stage of FIG. 1(A) again, whereby the port 222 is opened and the drain port 224 is closed, so that the hydraulic pressure of the oil line 350 to the B0 is raised.

Here, when the solenoid valve S3 is on-off operated by high frequency wave and a ratio of on-time duration occupying in a cycle of on-off operation (duty ratio) is controlled, the hydraulic pressure commensurate to the duty ratio can be obtained in the oil line 350. Here, a signal from the oil pressure sensor 122 provided in the oil line 350 is inputted to the CPU 104. When the signal thus inputted is compared with the optimum hydraulic pressure predetermined (or calculated) from the throttle opening, the type of shift and the vehicle speed, and feedback-controlled, the optimum acting force of the brake B0 in accordance with the throttle opening, the type of shift, the vehicle speed and the like at that time point can be obtained.

Additionally, in this pressure regulating position, since the port 222 is not opened to the oil line 351, and a drain port 225 is opened, so that the hydraulic pressure does not act on an oil line 351 to the clutch C0.

Subsequently, the bottom stage of FIG. 1(A) illustrates a state where the solenoid valve S3 is continuously on. In this state, in the oil line 350 to the brake B0, the port 222 is closed and the port 224 is fully opened, whereby the hydraulic pressure is set at zero. When this state is brought about, the port 222 is opened to a port 227 for the first time, and the port 225 becomes closed, whereby the hydraulic pressure is fed to the oil line 351 to the clutch C0 (refer to arrow marks in FIG. 1(A)).

Figure 1B:
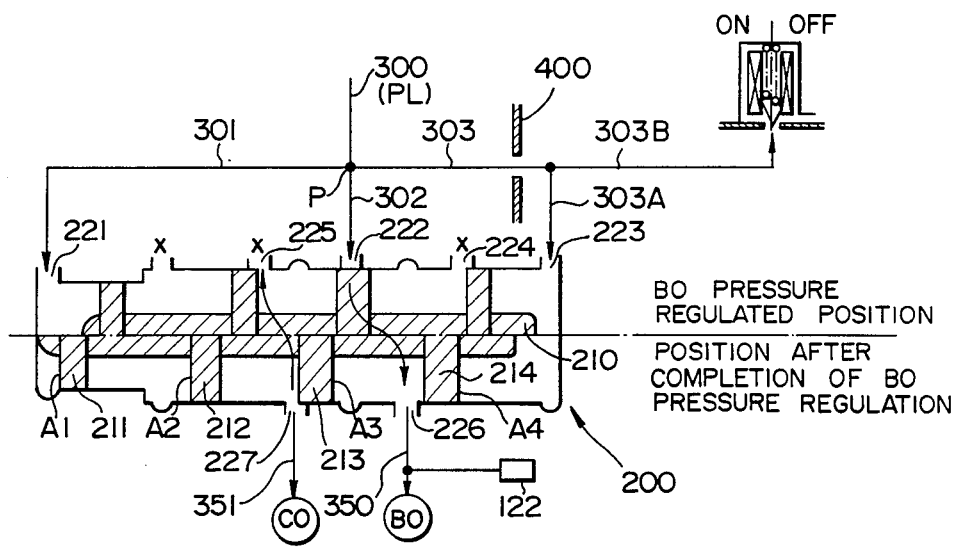

The bottom stage of FIG. 1(B) illustrates a state where the solenoid valve S3 is continuously off. In this state, the line pressure is fed to the brake B0 through the ports 222, 226 and the oil line 350, while, the hydraulic pressure of the clutch C0 is drained through the oil line 351, the ports 227 and 225 (refer to arrow marks in FIG. 1(B)).

Figure 2:
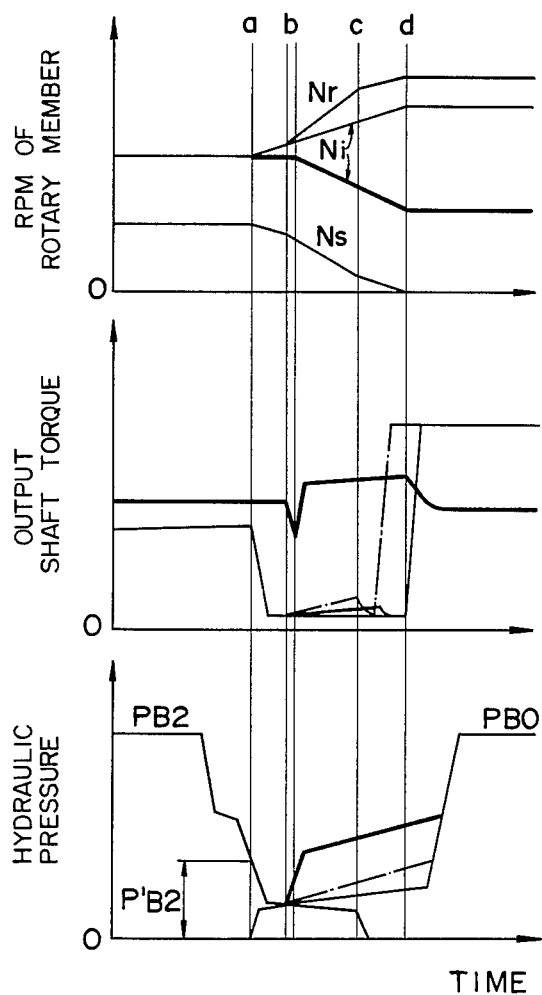
FIG. 2 is a chart showing the shift transition characteristic curves in the above embodiment.

Description will hereunder be given of the action of this embodiment with reference to the chart of the shift transition characteristic curves shown in FIG. 2.

As apparent from the chart shown in FIG. 4, a shift from the first speed to the second speed, a shift from the third speed to the forth speed and a shift from the fifth speed to the sixth speed are the up shift of the automatic transmission as a whole only by the high gear shift of the second transmission. And a shift from the third speed to the second speed and a shift from the fifth speed to the fourth speed are the down shift of the automatic transmission as a whole as accompanied by the high gear shift of the second transmission. Description will hereunder be given through the examples of the shift from the first speed to the second speed and the shift from the third speed to the second speed.

At the time of the shift from the first speed to the second speed:

Firstly, a shift judgment is made through the action similar to the conventional one (a shift judgment from the first speed to the second speed) at a point a in FIG. 2 in accordance with the vehicle speed, the throttle opening or a signal from a pattern select switch or the like. When this judgment is made, the CPU 104 duty-controls the duty valve 200 through the solenoid valve S3 on the basis of a high duty ratio preset (or on-line calculated by the CPU 104 itself) in accordance with the throttle opening, the type of shift (the shift from the first speed to the second speed) and the vehicle speed. As a result, a slightly higher hydraulic pressure PB0 indicated by a thick solid line at the bottom stage of FIG. 2 is made to act on the brake B0, and the shift is completed within an adequate time duration of time, and the shift shock does not become large.

At the time of the shift from the third speed to the second speed:

In this case also, a shift judgment is made through the action similar to the conventional one (a shift judgment from the third speed to the second speed) at a point a in FIG. 2 in accordance with the vehicle speed, the throttle opening or a signal from the pattern select switch or the like. When this judgment is made, the CPU 104 issues a shift command to the solenoid valve S1 to cause the first transmission 60 to start the shift, whereby the hydraulic pressure PB2 to the brake B2 is drained. The time point at which the first transmission 60 starts changes in rpm (an inertia phase), i.e. the time point at which the hydraulic pressure becomes PB2' is detected by the pressure switch 120, and thereafter, the hydraulic pressure PB0 is made to act on the brake B0 similarly to the above. In this case, the hydraulic pressure PB0 made to act on is held at a value as low as possible in accordance with the throttle opening, the type of shift (the shift from the third speed to the second speed) and the vehicle speed, on condition that the high gear shift of the second transmission is completed within the inertia phase of the first transmission, to thereby suppress the fluctuations of the output shaft torque (refer to one-dot chain lines and thin lines in FIG. 2).

Additionally, in FIG. 2, designated at Ni, Nr and Ns are the rpm of the shafts of the carrier 41, the ring gear 62 and the sun gear 61, respectively.

In the above embodiment, with this arrangement, in the case where the automatic transmission as a whole is up shifted only by the high gear shift of the second transmission, the acting force at the time of switching of the frictionally engaging device (brake B0) for performing the switching of the second transmission to the high gear shift is maintained at a value relatively highly, so that the up shift of the automatic transmission as a whole can be started and completed at satisfactory timings. On the other hand, in the case where the down shift of the automatic transmission as a whole is performed as accompanied by the high gear shift of the second transmission, the acting force to the brake B0 can be suppressed to a low value, so that the fluctuations of the output shaft torque can be suppressed.

Since the shifts of the second transmission are started and completed within the inertia phase of the first transmission, the shift shock can be further reduced, so that the driver is given a satisfactory down shift feeling.

Further, in the above embodiment, in determining the acting force of the brake B0, considerations are given to the engine load (the throttle opening) and the vehicle speed, whereby, in the case where the automatic transmission as a whole is up shifted only by the high gear shift of the second transmission or in the case where the automatic transmission as a whole is down shifted as accompanied by the high gear shift of the second transmission, if the engine load and the vehicle speed are high, then the acting force can be set at a value slightly high, and, if the engine load and the vehicle speed are low, then the acting force can be set at a value slightly low, respectively, so that further proper shift characteristics can be obtained.

Additionally, in the above embodiment, as the measure of sensing the start of the shift of the first transmission, the hydraulic pressure of the brake B2 has been detected. However, there are various other measures of sensing, such for example as the change in rpm of the engine, the change in rpm of one of the transmission members, movement of a piston of an accumutator provided in the oil line to the brake B2, the change in the output shaft torque, the change in acceleration of the vehicle in the longitudinal direction of the vehicle and the like.

Description will hereunder be given of the second embodiment.

Figure 5A:
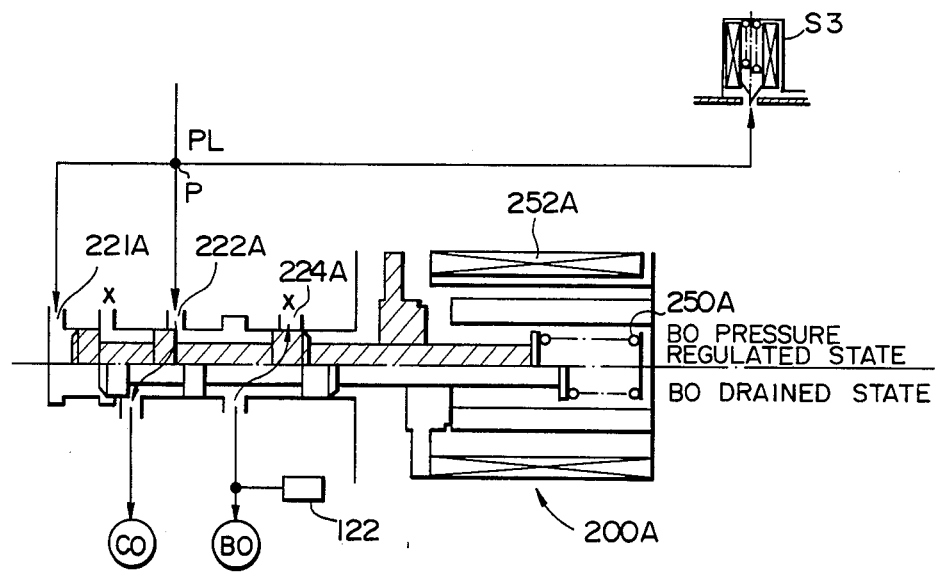
FIGS. 5(A) and 5(B) are essential portions of circuit diagrams corresponding to FIGS. 1(A) and 1(B), showing a second embodiment of the present invention.
Figure 5B:
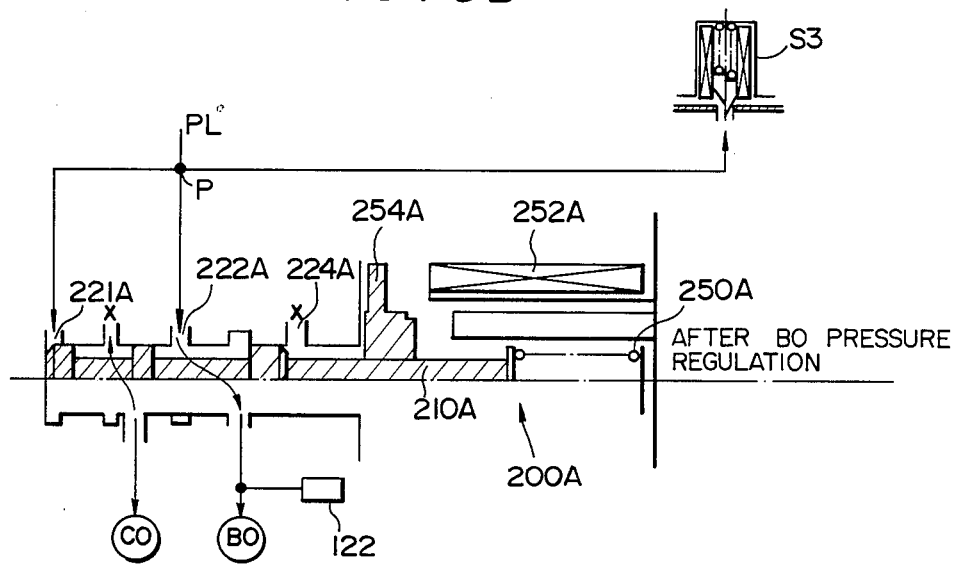

As shown in FIGS. 5(A) and 5(B), in this second embodiment, the duty valve 200 in the first embodiment is replaced by a solenoid valve 200A. The hydraulic pressure of the brake B0 can be desirably regulated by opening or closing the ports 222A and 224A. The opening or closing is determined by the position of a spool 210A. In this second embodiment, the spool 210A is determined in position by the balance between a force directed to the right due to the line pressure PL inputted to a port 221A and a force directed to the left due to a spring 250A and a force directed to left due to a magnetic force of a coil 252A (acting on a plunger 254A). In other words, in this second embodiment, a load current to the coil 252A is varied to control the hydraulic pressure to the brake B0. This load current to this coil 252A is regulated to the optimum value by the CPU 104 in accordance with the throttle opening, the type of shift and the vehicle speed. In this case, similarly to the first embodiment, the signal from the oil pressure sensor 112 is fed-back to perform the correcting control.

Other respects in arrangement and action are similar to those in the first embodiment.

Additionally, in the first and the second embodiments as described above, the one-way clutch F0 is provided in one portion of the second transmission of the automatic transmission, whereby, during the high gear shift of the second transmission, the brake B0 is made to act after the drain of the clutch C0, and, during the low gear shift of the second transmission, the clutch C0 is made to act after the drain of the brake B0, so that so-called double-clutching or the like does not occur, and a satisfactory shift can be performed. Furthermore, in the above embodiment, the duty valve 200 and the solenoid valve 200A themselves additionally function as shift valves. However, according to the present invention, irrespective of the presence of the one-way clutch F0, such an arrangement should naturally be adoptable that the conventional shift valve for switching the higher speeds to the lower speeds and vice versa of the second transmission is controlled by the ordinary (low speed responsing) solenoid valve, and a pressure regulating solenoid valve for duty-controlling the hydraulic pressure of the brake B0 is added.

Furthermore, in the above-described embodiments, the shifts from the first speed to the second speed and from the third speed to the second speed are exemplified, however, it is apparent that the present invention is similarly applicable to other shifts of the second transmission.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A shift control system of an automatic transmission for a vehicle, comprising:
   a first transmission and a second transmission, said first transmission including first and second solenoid valves for controlling frictionally engaging devices which can shift speeds of said first transmission independently of said second transmission, and said second transmission including a third solenoid valve for controlling other frictionally engaging devices which can shift speeds of said second transmission independently of said first transmission, wherein said first transmission and second transmission are shifted simultaneously or alternately to achieve multi-speed shiftings; and
   means for changing an acting force to said frictionally engaging devices of said second transmission at the time of shifting speeds of said second transmission at least in accordance with states of said first transmission.

2. A shift control system of an automatic transmission for a vehicle as set forth in claim 1, wherein the acting force at the time of switching of said frictionally engaging device is changed in accordance with engine load in addition to the type of shift.

3. A shift control system of an automatic transmission for a vehicle as set forth in claim 1, wherein said means for changing an acting force comprises a duty valve for regulating the hydraulic pressure to said frictionally engaging device by duty ratio control.

4. A shift control system of a automatic transmission for a vehicle as set forth in claim 2, wherein said changing means comprises a duty valve for regulating the hydraulic pressure to said frictionally engaging device which relates to the shift, by duty ratio control.

5. A shift control system of an automatic transmission for a vehicle as set forth in claim 4, wherein said duty valve further comprises a shift valve.

* * * * *